US010260990B2

(12) United States Patent
Chen et al.

(10) Patent No.: US 10,260,990 B2
(45) Date of Patent: Apr. 16, 2019

(54) MULTI-WAVELENGTH DMD MEASUREMENT APPARATUS AND METHODS

(71) Applicant: CORNING INCORPORATED, Corning, NY (US)

(72) Inventors: Xin Chen, Corning, NY (US); Jason Edward Hurley, Corning, NY (US); Ming-Jun Li, Horseheads, NY (US); Richard Stephen Vodhanel, Red Bank, NJ (US)

(73) Assignee: Corning Incorporated, Corning, NY (US)

( * ) Notice: Subject to any disclaimer, the term of this patent is extended or adjusted under 35 U.S.C. 154(b) by 57 days.

(21) Appl. No.: 14/251,869

(22) Filed: Apr. 14, 2014

(65) Prior Publication Data

US 2014/0368809 A1 Dec. 18, 2014

Related U.S. Application Data

(60) Provisional application No. 61/834,089, filed on Jun. 12, 2013.

(51) Int. Cl.
*G01N 21/00* (2006.01)
*G01M 11/00* (2006.01)

(52) U.S. Cl.
CPC ........ *G01M 11/338* (2013.01); *G01M 11/335* (2013.01)

(58) Field of Classification Search
CPC .. G01M 11/00; G01M 11/335; G01M 11/338; G01N 21/00; H01S 3/20;
(Continued)

(56) References Cited

U.S. PATENT DOCUMENTS 6,011,615 A * 1/2000 Mamyshev ........ G02B 6/02247
356/634
6,178,032 B1 * 1/2001 Huang .................. G02F 1/0123
359/237
(Continued)

OTHER PUBLICATIONS

Cheng et al; "Time-Domain Multimode Dispersion Measurement in a Higher-Order-Mode Fiber"; Optics Letters, Feb. 1, 2012, vol. 37, No. 3 pp. 347-349.
(Continued)

*Primary Examiner* — Jamil Ahmed
(74) *Attorney, Agent, or Firm* — Robert L. Carlson

(57) ABSTRACT

A differential mode delay (DMD) measurement system for an optical fiber is provided. The system includes an optical test fiber with a plurality of modes; a single mode light source that provides a continuous light wave signal to a modulator; and a pulse generator that provides an electrical pulse train signal to the modulator and a triggering signal to a receiver. The modulator is configured to generate a modulated optical test signal through the optical fiber based at least in part on the received light wave and pulse train signals, and the receiver is configured to receive the test signal transmitted through the fiber and evaluate the test signal based at least in part on the triggering signal. The system can be employed to create DMD waveform and centroid charts to obtain minEMBc bandwidth information for a fiber within a wavelength range.

19 Claims, 6 Drawing Sheets

(58) Field of Classification Search
CPC ... G02F 1/01; H04B 10/00; G02B 6/26; H04J 14/02; G06F 19/00; G01J 3/46
See application file for complete search history.

(56) References Cited

U.S. PATENT DOCUMENTS

| | | |
|---|---|---|
| 6,400,450 B1* | 6/2002 | Golowich et al. ........... 356/73.1 |
| 2010/0028020 A1* | 2/2010 | Gholami et al. .............. 398/159 |
| 2010/0128744 A1* | 5/2010 | Deladurantaye et al. ........ 372/6 |
| 2011/0075242 A1* | 3/2011 | Hu et al. ...................... 359/264 |
| 2011/0249973 A1* | 10/2011 | Donlagic .............. G01J 9/0246 398/79 |
| 2012/0063782 A1* | 3/2012 | Hu ......................... H01S 5/042 398/79 |

OTHER PUBLICATIONS

FOTP-220; "Differential Mode Delay Measurement of Multimode Fiber in the Time Domain" 35 Pages, Jul. 24, 2002.
IEC60793-1-41 "Optical Fibres: Part 1-41: Measurement Methods and Test Procedures—Bandwidth" 28 Pages, Jun. 26, 2009.
Japanese Industrial Standard "Test Methods for Bandwidth of Multimode Optical Fibers", JIS C 6824, 32 Pages, Dec. 21, 2009.
Patent Abstracts of Japanese 2010-101669, Jun. 5, 2010.
Pimpinella et al; "Differential Mode Delay (DMD) for Multimode Fiber Types and Its Relationship to Measured Performance"; OFC/NFOEC Conference; 2005 Technical Proceedings, 7 Pages.

\* cited by examiner

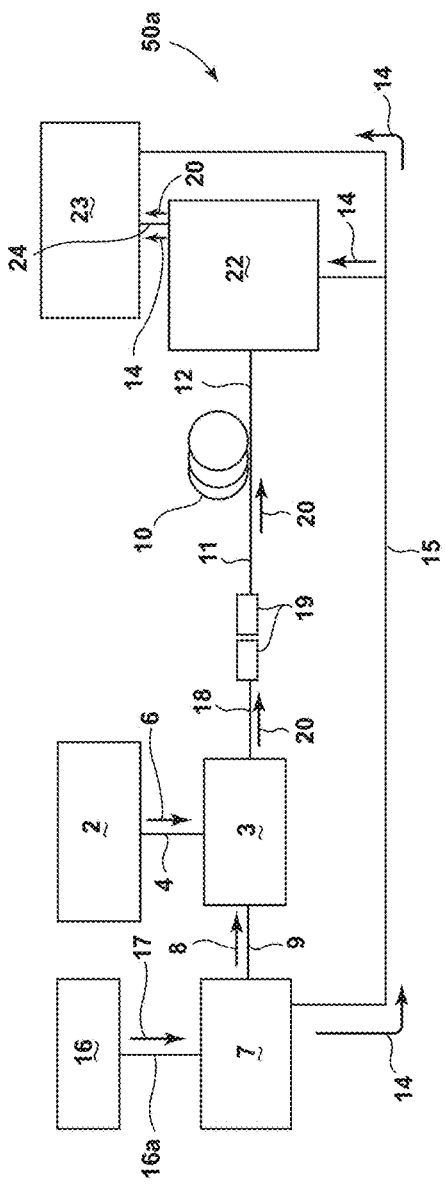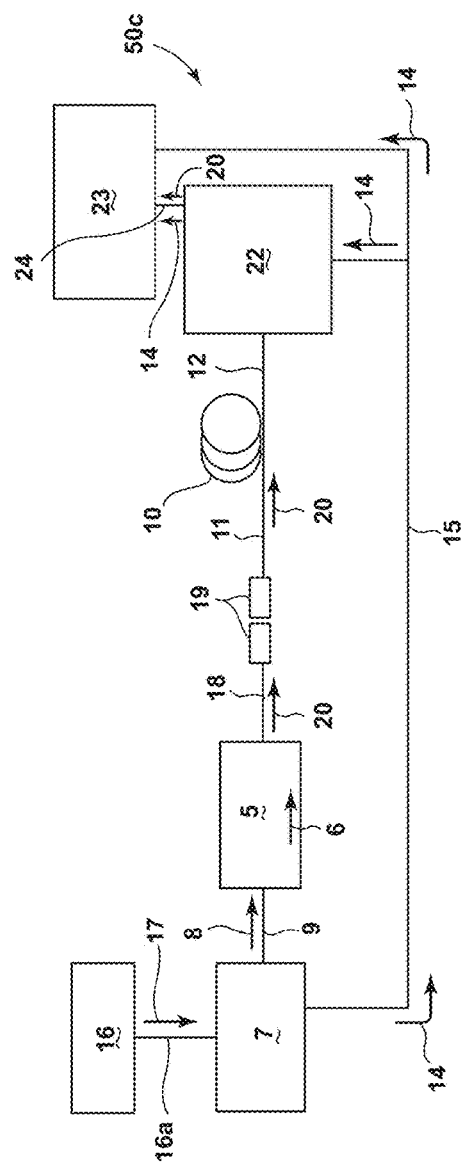
FIG. 1
FIG. 2

MULTI-WAVELENGTH DMD MEASUREMENT APPARATUS AND METHODS

This application claims the benefit of priority under 35 U.S.C. § 119 of U.S. Provisional Application Ser. No. 61/834,089 filed on Jun. 12, 2013 the content of which is relied upon and incorporated herein by reference in its entirety.

BACKGROUND

The present invention generally relates to measuring the bandwidth of optical multimode and few-mode fibers (MMFs and FMFs) and, more particularly, relates to methods and configurations for testing MMFs and FMFs by light transmission through the fiber.

Bandwidth is an important attribute of MMF and FMF products. Ultimately, bandwidth is used in the optical fiber industry to set the grade of the MMF and FMF products. The bandwidth is directly related to how the refractive index profile of the MMF and FMF exists in practice compared to the ideal, optimal profile for a given fiber configuration. The bandwidth exhibited by a given MMF or FMF is generally very sensitive to even a slight deviation from the ideal, optimal profile.

One method for measuring the bandwidth of an MMF or FMF is to apply a light signal at one end of the fiber, receive the transmitted light signal at the other end, and measure bandwidth through the known, differential mode delay (DMD) measurement technique. The DMD method records the time delay of the transmitted signal through the fiber. The method involves launching the light signal from a single mode test fiber, offset from the center-line of the MMF or FMF on test, and this offset is varied across the face of the MMF or FMF under test. Further, data processing is used to convert the time pulses versus radial offset position into a bandwidth result.

Usually, a short pulsed laser is employed to transmit the light signal through the MMF or FMF. The short pulsed laser in these test configurations is typically limited to one wavelength, around 850 nm. Ti-sapphire lasers can be employed in these configurations, but are expensive and difficult to maintain.

SUMMARY

According to one embodiment, a differential mode delay measurement system for an optical fiber is provided. The system includes an optical test fiber with a plurality of modes; a single mode light source that provides a continuous light wave signal to a modulator; and a pulse generator that provides an electrical pulse train signal to the modulator and a triggering signal to a receiver. The modulator is configured to generate a modulated optical test signal through the optical fiber based at least in part on the received light wave and pulse train signals, and the receiver is configured to receive the test signal transmitted through the fiber and evaluate the test signal based at least in part on the triggering signal.

According to another embodiment, a differential mode delay measurement system for an optical fiber is provided. The system includes an optical test fiber with a plurality of modes; a single mode tunable laser that transmits a continuous light wave signal to a modulator unit; and a pulse generator that provides an electrical pulse train signal to the modulator unit and a triggering signal to a receiver. The modulator is configured to generate a modulated optical test signal through the multimode fiber based at least in part on the received light wave and pulse train signals, and the receiver is configured to receive the test signal transmitted through the fiber and evaluate the test signal based at least in part on the triggering signal.

According to a further embodiment, a method of measuring optical properties of an optical fiber with a plurality of modes is provided. The method includes the steps: directing a single mode continuous light wave signal to a modulator; directing an electrical pulse train signal to the modulator; directing a triggering signal to a receiver based at least in part on the electrical pulse train signal; and generating a modulated optical test signal based at least in part on the light wave and pulse train signals. The method also includes the steps: transmitting the modulated optical test signal through an optical test fiber; receiving the modulated optical test signal transmitted through the optical fiber; and evaluating the received test signal based at least in part on the triggering signal.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 is a schematic diagram illustrating a differential mode delay measurement system for an optical fiber according to one embodiment;

FIG. 2 is a schematic diagram illustrating a differential mode delay measurement system for an optical fiber according to another embodiment;

DETAILED DESCRIPTION

Figure 1A:
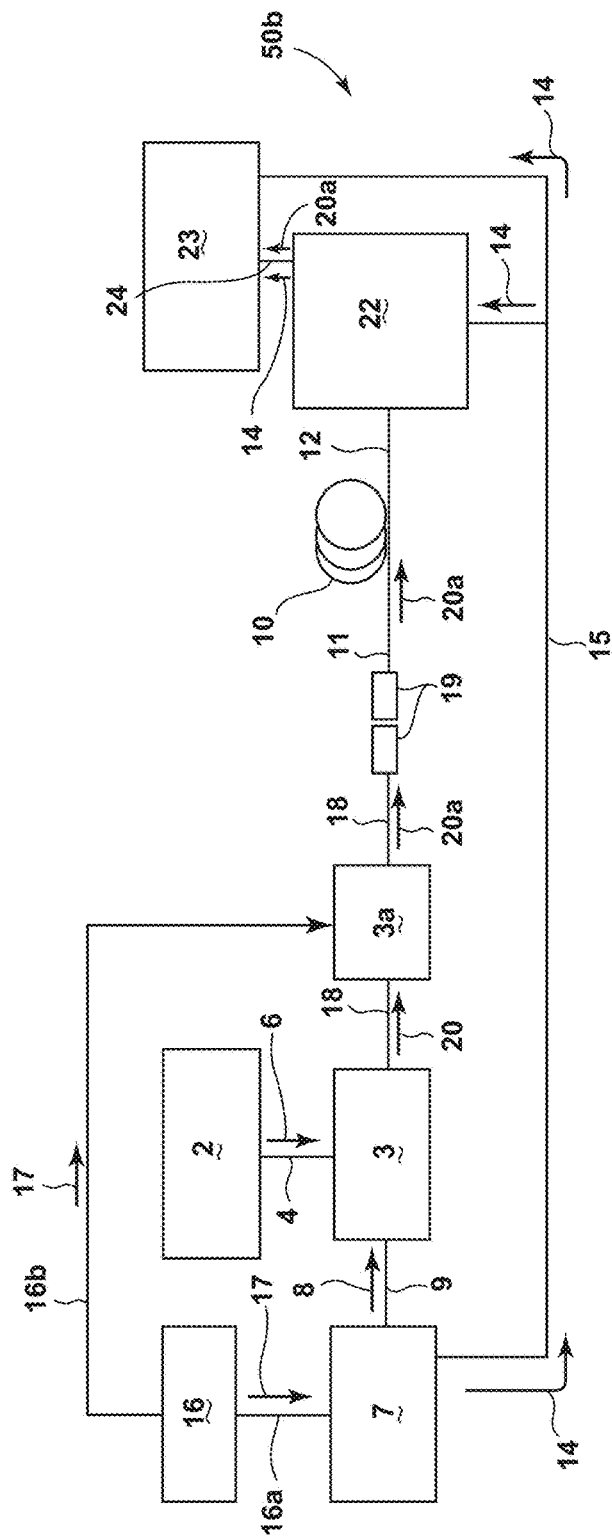
FIG. 1A is a schematic diagram illustrating a differential mode delay measurement system for an optical fiber according to an additional embodiment.

Reference will now be made in detail to the present preferred embodiments, examples of which are illustrated in the accompanying drawings. Whenever possible, the same reference numerals will be used throughout the drawings to refer to the same or like parts.

New applications for MMFs and FMFs are emerging at wavelengths other than 850 nm. For example, certain applications require optical fiber performance at higher wavelengths—980 nm, 1060 nm and 1310 nm. Coarse wavelength division multiplexing-based (CWDM) applications also may employ MMFs around certain wavelengths with 10-20 nm spacing. Accordingly, there is an emerging need for testing configurations that can be employed to evaluate the bandwidth of MMFs and FMFs at multiple wavelengths.

One approach, described in more detail below, addresses this need. A DMD measurement system can be configured to test MMFs and FMFs at multiple wavelengths in a wide range from about 600 to 1700 nm or a subrange within the wide range, for example, 800-900 nm, 980-1100 nm, 1250-1360 nm, and 1410-1650 nm. The measurement system is based on the use of bit error rate (BER) testing equipment and can include a pattern generator, clock/synthesizer, and digital communication analyzer. The system can be configured using 10 gigabits, 25 gigabits or even 32 gigabits per second, equipment facilitating DMD measurements with very high time resolution.

One embodiment of the DMD measurement system for MMFs and FMFs is depicted in FIG. 1. In particular, FIG. 1 provides a DMD measurement system 50a configured to measure the bandwidth of an optical test fiber 10, i.e., an optical fiber arranged within system 50a for the purpose of evaluation and/or characterization. Optical test fiber 10 can have a plurality of modes. Accordingly, optical fiber 10 may be an MMF or a FMF.

System 50a includes a laser 2 that transmits a continuous light wave signal 6 at a selected wavelength through a polarizing maintaining fiber (PM) 4 to a modulator unit 3, configured to modulate signal intensity. Laser 2 may be a single mode laser or, more preferably, a single mode tunable laser capable of generating light at various wavelengths, typically in the range of about 600 nm to 1700 nm. Laser 2 may also possess a narrow linewidth of 0.2 nm or less, preferably 0.1 nm or less or, even more preferably, 0.05 nm or less. Laser 2 may also generate a light wave signal 6 with wavelengths in a subrange within the range of about 600 nm to 1700 nm (e.g., 800-900 nm). Consequently, laser 2 can be employed to generate multiple light wave signals 6, each at a different wavelength, throughout a sequence of testing for an optical fiber 10. A polarization controller (not shown) may be employed instead of PM fiber 4 to align the state of polarization of the light wave signals emanating from the laser 2 entering the modulator unit 3.

DMD measurement system 50a includes a pulse generator 7 that provides an electrical pulse train signal 8 through a pulse generator coupling 9 into the modulator unit 3. The electrical pulse train signal 8 is generally an electric signal operating at radio frequencies (RF) and given by a series of pulses with varied widths or durations. Here, pulse train signal 8 can comprise a pseudo-random binary sequence (PRBS) or a custom pulse sequence. The pulse generator 7 may provide an electrical pulse train signal 8 with a full width at half maximum (FWHM) of about or less than 200 picoseconds, or even about or less than 120 picoseconds. Further, the pulse train signal 8 may have a FWHM of about or less than 60 picoseconds.

Referring to FIG. 1, pulse generator 7 may also be a pattern generator device. One preferred pulse sequence employed in the pulse train signal 8 is a pulse sequence with a single 1 bit followed by many 0 bits. The bit sequence employed in the electrical pulse train signal 8, such as a pseudo random bit sequence (PRBS), can have a bit length in the format of $2^N-1$, where N can take the value of 7, 11, 15, 23, 31 etc. When pulse generator 7 is a pattern generator device, it may provide an electrical pulse train signal 8 at or above 10 gigabits per second. Certain pattern generator devices can also generate a pulse train signal 8 at or above 16 gigabits per second, or even 25 gigabits per second. At 10 gigabits per second, the rough pulse width of the pulse train signal 8 is around 100 picoseconds, comparable to the performance of conventional DMD measurement systems. At 25 gigabits per second, however, the rough pulse width of the pulse train signal 8 is on the order of 40 picoseconds, indicative of very high time resolution capability.

The electrical pulse train signal 8, typically an electric signal operating at RF, is directed into the modulator unit 3. The modulator unit 3 can be a $LiNbO_3$ modulator as known in the art. Besides modulating the intensity of received signal 6, the modulator unit 3 is also configured to convert the electrical pulse train signal 8 into an optical signal. In particular, modulator unit 3 is configured to generate a modulated optical test signal 20 based at least in part on the received light wave signal 6 and electrical pulse train signal 8.

It should be understood that if the electrical pulse train signal 8 is not at a sufficiently high voltage, an amplifier (not shown) can be used to boost the signal 8 to a higher voltage level before it reaches the modulator unit 3. For example, the modulator unit 3 may operate at RF levels in the range of 5-6 $V_{pp}$ (voltage peak-to-peak) for optimum performance. Sometimes, a pulse generator 7 cannot provide sufficiently high voltage output to the modulator unit 3. For example, at only 1 $V_{pp}$ output, an additional amplifier is needed to boost the electrical pulse train signal 8 sent to the modulator unit 3. The bandwidth of the amplifier should be matched to the bandwidth of the signal to avoid unnecessary broadening of the pulse. For a pulse from a 10 gigabit per second pulse generator 7, the amplifier should have a bandwidth of around 10 GHz or higher. Similarly, an amplifier with around 25 GHz or higher bandwidth should be employed for a 25 gigabit per second pulse generator 7.

As configured in the DMD measurement system 50a shown in FIG. 1, the modulated optical test signal 20 from the modulator unit 3 is directed into the optical fiber 10 on test (MMFs and FMFs). Optical test signal 20 can be launched into various radial positions within the optical fiber 10 through a single mode launch fiber 18 (see FIG. 1) or via focusing optics with a small spot size (not shown). Launch fiber 18 is configured within system 50a as a means to convey optical test signal 20 to the optical fiber 10 (e.g., an MMF or FMF) on test. A radial offset between the radial input location of the modulated optical test signal 20 and the center-line of optical fiber 10 can be controlled by a fiber translation stage 19, a mechanical device as understood in the art for controlling the radial launch location of a signal emitting from one fiber butt-coupled to another. In particular, fiber translation stage 19 can be used to direct the modulated optical test signal 20 through a plurality of radial locations in the fiber 10 via launch fiber 18 (e.g., directing the signal 20 from the center-line of fiber 10 to a radial location in close proximity to the outer diameter of fiber 10). Fiber translation stage 19 may be a precision fiber translation stage device or a programmable fusion splicer (e.g., an ERICSSON FSU-975 fusion splicer) used solely as an alignment stage without a splicing function. The modulated optical test signal 20 is directed through the first end 11 of optical fiber 10. The signal is then transmitted through optical fiber 10, exiting through its second end 12 into a receiver 22.

Alternatively, an imaging system 19a (not shown) may be used in place of fiber translation stage 19. The imaging system is coupled to the modulator unit 3 and first end 11 of optical fiber 10. The imaging system 19a obtains an image of optical test signal 20 from the modulator unit 3 and then transmits the image as output into the first end 11. Advantageously, imaging system 19a minimizes physical contact between the end 11 of fiber 10 and the modulator unit 3, which can improve transmitted test signal quality through the optical fiber 10 on test.

Referring to FIG. 1, the modulated optical test signal 20 is collected and received by receiver 22. Receiver 22 can be a photo detector or optical receiver. Further, receiver 22 can be coupled to a scope 23 via scope coupling element 24. As photo detector elements often possess a low electric output, it may be necessary to employ one or two linear amplifiers (not shown) in the receiver 22 to boost the signal for proper processing by the scope 23. Alternatively, receiver 22 can be an optical receiver (not shown) which has a built in linear amplifier sufficient to generate a signal level high enough for processing by the scope 23. One function of the scope 23 is to record the modulated optical test signals 20 directed through the optical fiber 10 as set at various launch offset increments through the radius of optical fiber 10 (e.g., through the center of fiber 10, through radius increments in fiber 10 from its center to its outer diameter, etc.). It should also be understood that receiver 22 and scope 23 can be integrated as a single receiver unit 22.

Scope 23 may comprise an oscilloscope or other type of digital communication analyzer that displays an electrical signal over a particular time window. For the scope 23 to work it often needs to receive an input triggering signal so that the scope can accurately and repeatedly evaluate the electrical signal relative to a given time window. A "time-sampling oscilloscope," measures only the instantaneous amplitude of the waveform at the sampling instant, whereas a "real-time" oscilloscope, sometimes called a "single-shot" scope, captures an entire waveform upon the receipt of each triggering signal or triggering event as understood by those with ordinary skill in this field. Put another way, a large number of data points are captured in one continuous record as a function of time with a "real-time" oscilloscope employed as scope 23. Either way, a "time-sampling" oscilloscope or a "real-time" oscilloscope employed as scope 23 needs an explicit trigger in order to operate, and this trigger needs to be synchronized with the input data.

As such, triggering is an important aspect of the DMD measurement system 50a depicted in FIG. 1. Triggering ensures that the scope 23 analyzes and/or collects the modulated optical test signal 20 at a fixed timing relative to the initial pulse (e.g., electrical pulse train signal 8) generated from the pulse generator 7. The pulse generator 7 provides a triggering signal 14 to the receiver 22 and/or the scope 23 via triggering signal coupling 15. In some configurations, a clock 16 may provide a clock signal 17 via coupling 16a to the pulse generator 7. For example, clock signal 17 can be a signal that oscillates between a high and a low state at predetermined, constant time increments. As such, the triggering signal 14 generated by pulse generator 7 is then based at least in part on the received clock signal 17. That is, the triggering signal 14 is sent by pulse generator 7 when a micro-controller or the like in the generator 7 detects the rising or falling edge of the pulse train signal 8. A triggering signal 14 is transmitted for each pulse in pulse train signal 8 and it repeats according to the repetition rate the pulses in pulse train signal 8. Without the proper triggering, the received modulated optical test signal 20 will "float" without a baseline for evaluating the required time delay for purposes of evaluating DMD. In other words, the triggering enables an evaluation of the transmitted pulse in optical test signal 20 relative to the initial electrical pulse train signal 8. In turn, system 50a can generate a large volume of test data that can be averaged to get more reliable results.

In particular, when the pulse generator 7 is a pattern generator, it can provide a divided clock (e.g., a signal with a period that is a fraction of the period of clock signal 17) via triggering signal 14 to the scope 23 that matches the length of the bit sequence in the electrical pulse train signal 8. Note that for a pattern generator, the clock 16 controlling the pattern generator is operating at the rate the bit (1 vs. 0) is generated (such as 10 Gb/s or 25 Gb/s) while the bit sequence can have a certain length. Since a custom bit sequence can be employed by the pulse generator 7 to generate a single '1' bit with many '0' bits, a triggering signal 15 should be provided at the rate the '1' bit is repeated. For example, if the pulse generator 7 employs a $2^7-1$ bit sequence, each '1' bit is generated over 127 bits so that the repetition rate is the bit rate divided by 127. A pattern generator often has a built-in divided clock. In this example, the divided clock is set at 1/127 of the bit rate and is used to provide the triggering signal 14 for the scope 23.

By utilizing the triggering signal 14, the relative delay between the transmission of pulse train signal 8 and modulated optical signal 20 through fiber 10 on one end, and the receipt of the signal 20 by the receiver 22 on the other end of the fiber, can be reliably measured. As such, the receiver 22 can be configured to receive the modulated optical signal 20 transmitted through fiber 10 and evaluate signal 20 based at least in part on the triggering signal 14. The waveforms and pulse train windows associated with modulated optical signal 20 (derived from pulse train signal 8) that is acquired by receiver 22 and displayed by scope 23 can be averaged over many traces to reduce test-related noise, thus improving the robustness of DMD measurements made by system 50a. Further, the waveforms and pulse train windows associated with modulated optical signal 20 can be transmitted at a plurality of wavelengths according to the capability of the laser 2. As such, DMD data associated with fiber 10 can be collected at a plurality of wavelengths by receiver 22 and scope 23. A time-sampling oscilloscope can be employed for scope 23 for these purposes. Alternatively, receiver 22 and/or scope 23 can be replaced with a real-time oscilloscope device (not shown) to evaluate modulated optical signal 20 in real time. When the pulse generator 7 is a generic pulse generator (not a pattern generator type specifically configured to measure the bit error rate of a digital communication system), the clock 16 provides a clock signal 17 at a frequency at the repetition rate of the pulse train in electrical pulse train signal 8 (instead of at the bit rate for pattern generator). As such, the triggering signal 14 used by the scope 23 comes directly from clock 16, and not from a divided clock for the case in which pulse generator 7 is a pattern generator.

In another exemplary embodiment, DMD measurement system 50b is depicted in FIG. 1A. System 50b is largely similar to system 50a; however, system 50b employs a second modulator unit 3a configured in series with modulator unit 3. In particular, the second modulator unit 3a receives modulated optical signal 20 via a launch fiber 18, and then transmits modulated signal 20a into a second launch fiber 18 as shown in FIG. 1A. A clock signal 17 from clock 16 is also directed into modulator unit 3A via coupling 16b. An RF delay component (not shown) may also receive the signal 17 from clock 16 such that it is configured to further delay the signal 17 relative to the timing of the electrical pulse train signal 8. The RF delay component will then relay the delayed signal 17 to modulator unit 3a. Clock signal 17 is then used to drive modulator unit 3a such that the unit 3a transmits a shorter pulse width in signal 20a relative to the pulse width of received signal 20. As such, the pulse width of signal 20a can be at least 50% narrower than the pulse width of signal 20. With the setup of system 50b, a lower speed (and lower cost) pulse generator could be used for generator 7, as compared to the pulse generator 7 typically employed in system 50a. It is also possible with the setup of system 50b to utilize the narrower pulse width in signal 20 to increase the quantity of DMD data obtained during the testing of optical fiber 10, thus improving the accuracy and reliability of the fiber characterization and evaluation.

As shown in FIG. 2, a DMD measurement system 50c can also be configured to measure the bandwidth of an optical fiber 10. The primary difference between DMD measurement systems 50a, 50b and 50c is that system 50c relies on a single, light transmitter modulator unit 5 rather than separate tunable laser 2 and modulator 3 units. As such, the transmitter modulator unit 5 in DMD measurement system 50c includes a light source (not shown) that provides a continuous light wave signal 6 to an internal modulator (not shown). The characteristics of the light wave signals 6 provided by transmitter modulator unit 5 are comparable to those produced by laser 2 and modulator unit 3 (see FIG. 1). Further, the pulse generator 7 shown in FIG. 2 provides an electrical pulse train signal 8 to the transmitter modulator unit 5. Like the modulator unit 3 depicted in FIG. 1, the transmitter modulator unit 5 depicted in FIG. 2 can modulate signal intensity. As such, the transmitter modulator unit 5 is configured to generate a modulated optical test signal 20 through the fiber 10 on test based at least in part on the light wave signal 6 and the electrical pulse train signal 8. Unless otherwise noted, system 50c operates in a similar fashion as DMD measurement systems 50a and 50b. Further, elements in common between systems 50a and 50b operate and function in a similar fashion.

In DMD measurement system 50c, the transmitter modulator unit 5 can be a commercial off-the-shelf transmitter within a packaged transceiver. Small form-factor pluggable (SFP+ and XFP) single mode transceivers operating at 1310 nm or 1550 nm, for example, can be employed for transmitter modulator unit 5.

The DMD measurement systems 50a, 50b and 50c depicted in FIGS. 1, 1A and 2 have been experimentally validated. Several wavelength windows have been employed with laser 2 and transmitter modulator unit 5, including wavelength windows ranging from 796 to 880 nm and 993-1070 nm, along with a set of wavelengths around 1310 nm, and another set of wavelength around 1550 nm. In one example, DMD measurement system 50a (see FIG. 1) was employed to generate bandwidth test data on a high bandwidth MMF with a length of 980 m. The results are depicted in FIGS. 3A, 3B, 4A and 4B. A SUPERLUM™ tunable laser with an operating range from 796 nm to 880 nm was employed as laser 2 in DMD measurement system 50a for these measurements.

Figure 3A:
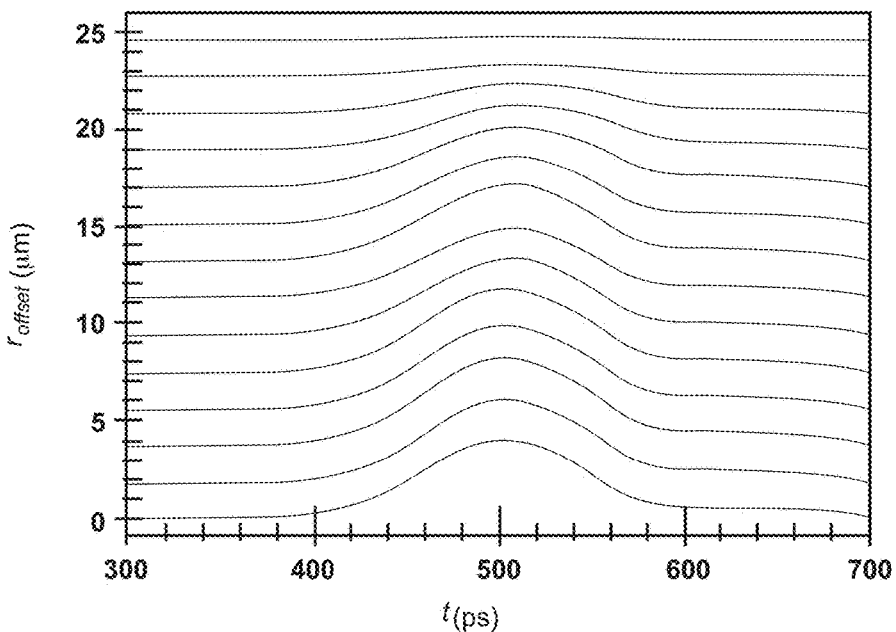
FIG. 3A is a plot of a differential mode delay waveform for a 980 m long multimode optical fiber, tested at a wavelength of 850 nm with the configuration depicted in FIG. 1.
Figure 3B:
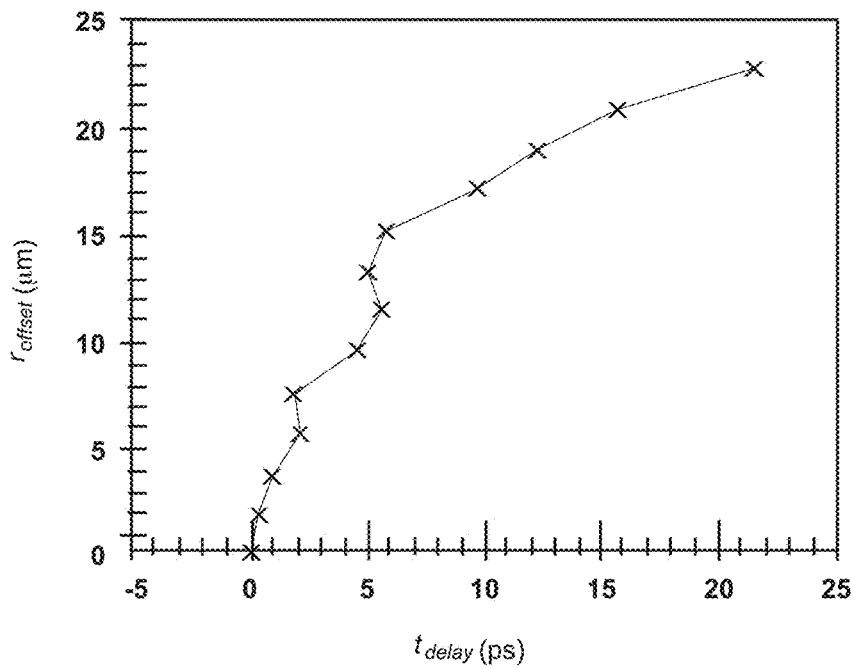
FIG. 3B is a plot of the differential mode delay centroid (radial launch offset vs. time delay) for the fiber tested in FIG. 3A.

The results from measurements performed on the 980 m MMF (optical fiber 10) using DMD measurement system 50a at an operating wavelength of 850 nm are depicted in FIGS. 3A and 3B. FIG. 3A is a plot of a differential mode delay waveform for the 980 m MMF. In particular, a trace with signal amplitude information, I (on y-axis), for each tested radial launch offset, $r_{offset}$ (μm), (e.g., between the fiber translation stage 19 set at the center-line of the first end 11 of fiber 10 and the radial launch position into the first end 11 of the optical fiber 10) is plotted as a function of time, t (ps). The time corresponding to the center of the pulse, $t_c$, observed by the scope 23 can be calculated.

One approach is given below by Equation (1):

$$t_c = \sqrt{\frac{\int t^2 \cdot I(t)dt}{\int I(t)dt}} \qquad (1)$$

where I(t) is the pulse signal amplitude and the integration covers the duration of the pulse.

FIG. 3B is a plot of the differential mode delay centroid for the same 980 m long MMF. In particular, $r_{offset}$ (μm) is plotted as a function of relative time delay, $t_{delay}$ (ps). As shown in FIG. 3A, the waveforms of the tested MMF slightly shift to the right (i.e., longer delay times) as a function of radial launch offset, $r_{offset}$. This effect is also clearly depicted in FIG. 3B, as the relative delay ($t_{delay}$) of the tested MMF exceeds 20 ps at a radial launch offset ($r_{offset}$) of about 22 μm. The data shown in FIGS. 3A and 3B were used to calculate a peak bandwidth wavelength of 838 nm for the 980 m MMF by applying standard algorithms for calculating and evaluating bandwidth for MMFs and FMFs (IEC 60793-1-41 Ed. 3.0: Optical Fibres: Part 1-41: Measurement Methods and Test Procedures—Bandwidth (2009); JIS C 6824: Test Methods for Bandwidth of Multi-mode Optical Fibers (2009)).

Figure 4A:
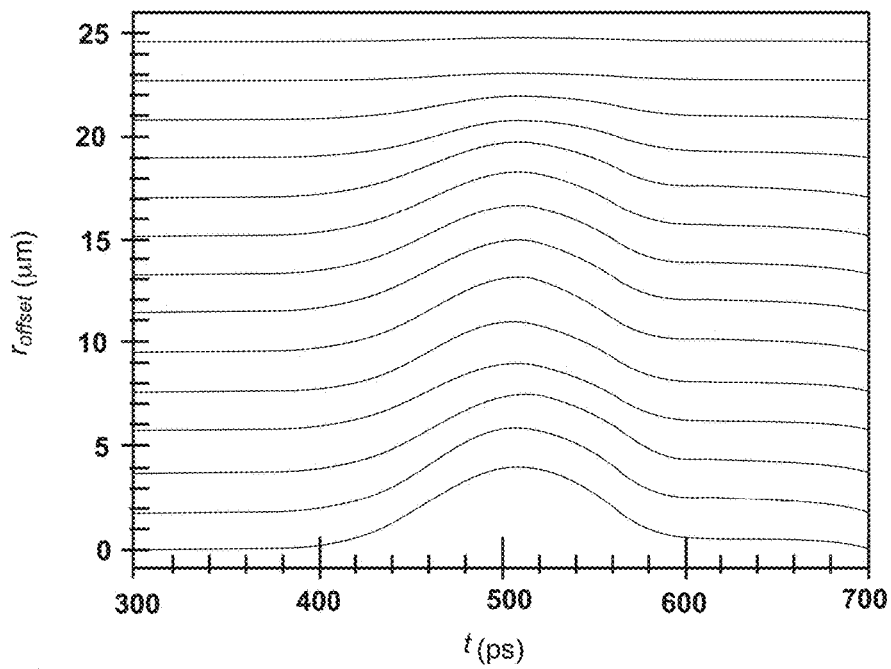
FIG. 4A is a plot of a differential mode delay waveform for the fiber tested in FIG. 3A, tested at a wavelength of 838 nm with the configuration depicted in FIG. 1.
Figure 4B:
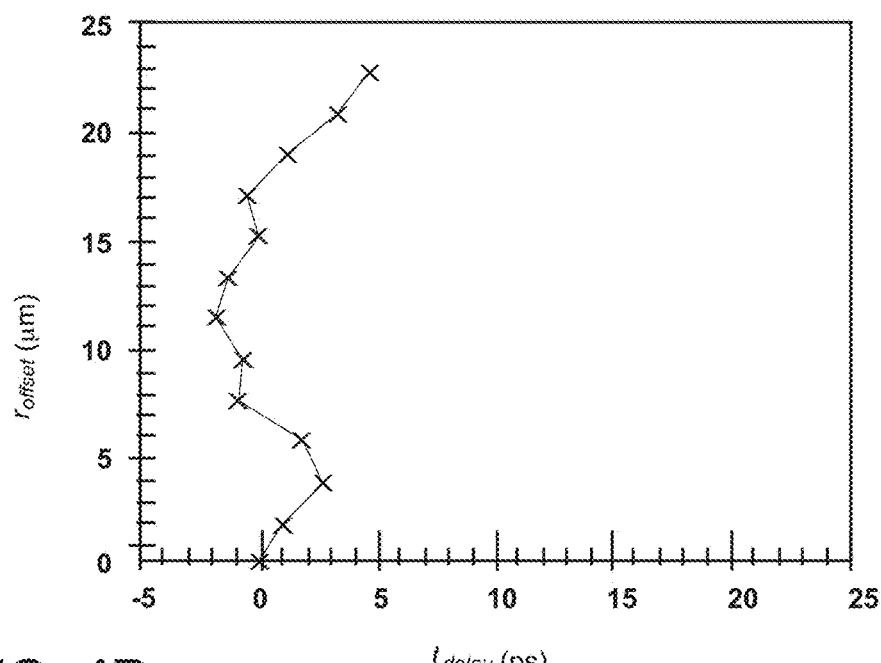
FIG. 4B is a plot of the differential mode delay centroid (radial launch offset vs. time delay) for the fiber tested in FIG. 4A.

As shown in FIGS. 4A and 4B, the same 980 m MMF evaluated earlier at a wavelength of 850 nm using the DMD system 50a (see FIGS. 3A and 3B) was tested at a wavelength of 838 nm (i.e., the wavelength associated with the calculated peak bandwidth for this MMF). FIG. 4A is a plot of a differential mode delay waveform for the 980 m MMF tested at 838 nm. In particular, the radial launch offset, $r_{offset}$ (μm) is plotted as a function of time, t (ps). FIG. 4B is a plot of the differential mode delay centroid for the same MMF tested at 838 nm. In particular, $r_{offset}$(μm) is plotted as a function of relative time delay, $t_{delay}$ (ps). As shown in FIG. 4A, the waveforms of the tested MMF does not shift significantly to the right (i.e., longer delay times) as a function of radial launch offset, $r_{offset}$. This effect is clearly depicted in FIG. 4B, as the relative delay ($t_{delay}$) of the tested MMF does not increase significantly as a function of radial launch offset ($r_{offset}$). In fact, the relative delay ($t_{delay}$) of the 980 m MMF tested at 838 nm is only within about 5 ps at a radial launch offset ($r_{offset}$) of about 23 μm from the center-line of the MMF and the variability of the relative delay as a function of radial launch offset is on the same order as the expected measurement uncertainty associated with the DMD measurement system 50a.

In another example, DMD measurement system 50c was employed to test a 1 km MMF optimized for performance at 1310 nm. In this test, a commercial SFP+ singe mode transceiver served as the transmitter modulator unit 5 and a pattern generator operating at 10 gigabits/second served as the pulse generator 7. The tests were performed at 1310 nm. DMD values were relatively flat as a function of the radial launch offset (e.g., between the fiber translation stage 19 and the first end 11 of the optical fiber 10) as a function of waveform time delay. Standard algorithms and procedures (IEC 60793-1-41 Ed. 3.0; JIS C 6824) were used to calculate minEMBc and overfill bandwidth for this 1 km MMF: 2.86 GHz*km and 2.82 GHz*km, respectively.

Figure 5A:
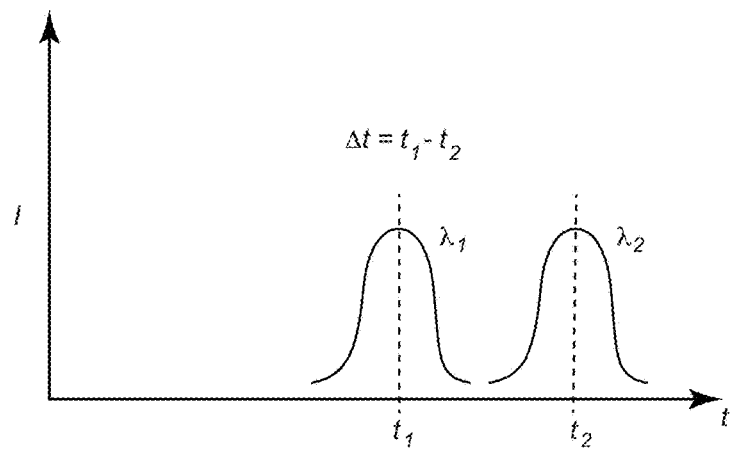
FIG. 5A is a schematic for measuring the differential mode delay and chromatic dispersion between the fundamental mode and other higher order modes of an MMF or FMF using a differential mode delay measurement system according to a further embodiment.

DMD measurement systems 50a, 50b and 50c may also be used to measure the DMD, chromatic dispersion, and/or the difference in chromatic dispersion, between the fundamental mode LP01 and a higher order mode such as the LP11 or LP02 modes of MMFs and FMFs. A schematic for measuring the DMD and chromatic dispersions of an MMF or FMF using systems 50a, 50b and 50c is depicted in FIG. 5A. At wavelength $\lambda_1$, a modulated optical test signal 20 is launched into the fiber 10 under test, and the pulse observed (signal amplitude, I) in the scope 23 is schematically shown at time $t_1$. The wavelength of the continuous light wave signal 6 transmitted by laser 2 (e.g., as employed in system 50a) or light transmitter 5 (e.g., as employed in system 50c) is subsequently adjusted to a second wavelength $\lambda_2$, which results in a pulse at time $t_2$ on the scope 23. The DMD difference between the two time "locations" on the scope 23 is recorded to be $\Delta t = t_1 - t_2$.

The chromatic dispersion of the fiber 10 at a wavelength of around $(\lambda_1 + \lambda_2)/2$ is then calculated according to Equation (2) as:

$$CD = \Delta t / [(\lambda_1 - \lambda_2) \cdot l] \quad (2)$$

where l is the length of the fiber 10 under test in system 50a, 50b and 50c. When the pulse shape is well behaved such as in a quasi-Gaussian shape, the time location of the pulse is obtained at the peak amplitude value. However, when the shape of the pulse is distorted after propagating through the fiber 10 under test, a more refined algorithm, such as Equation (1), can be used to calculate the location of the pulse on the scope 23.

The chromatic dispersion of a 1 km long MMF (i.e., optical fiber 10 in system 50a) was evaluated using test system 50a. When employing a modulated optical test signal 20 at a wavelength of 850 nm, this MMF exhibited a chromatic dispersion of -97.5 (ps/nm*km). At a wavelength of 860 nm for test signal 20, this MMF exhibited a chromatic dispersion of -90.25 (ps/nm*km).

According to another embodiment, the DMD and chromatic dispersion difference between the fundamental mode LP01 and a higher order mode (e.g., LP11, LP02, etc.) for MMFs and FMFs can be measured. For FMFs, DMD measurement system 50a as depicted in FIG. 1 can be employed to obtain the group delay of each mode and chromatic dispersion difference values. When the single mode launch fiber (e.g., launch fiber 18) is well aligned to the center of the FMF under test (e.g., fiber 10), typically only the fundamental mode and a circular symmetric higher order mode (e.g., LP02) of the FMF are excited. When the center-lines of the single mode launch fiber 18 and the fiber 10 under test are intentionally misaligned by a few microns, higher order mode(s) (e.g., LP11) can be launched within fiber 10, and appear on the scope 23.

Figure 5B:
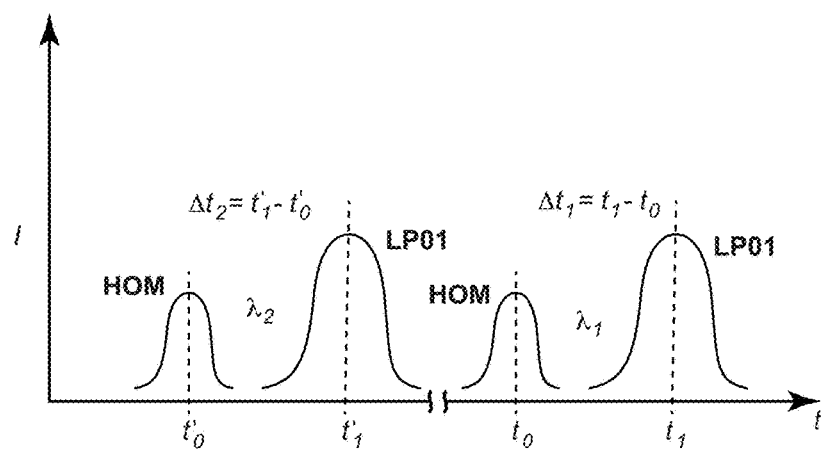
FIG. 5B is a schematic for measuring the differential mode delay and difference in chromatic dispersion between the fundamental mode and other higher order modes of an MMF or FMF using a differential mode delay measurement system according to an additional embodiment.

FIG. 5B provides a schematic for measuring the DMD and chromatic dispersion difference in MMFs and FMFs. As depicted in FIG. 5B, the DMD, $\Delta t$, is evaluated at two wavelengths, $\lambda_1$ and $\lambda_2$. In particular, the DMD for the LP01 mode and a higher order mode (HOM) at wavelength, $\lambda_1$, is given by $\lambda t_1 = t_0$ (HOM)$-t_1$ (LP01). Similarly, the DMD for the LP01 and HOM at wavelength, $\lambda_2$, is given by $\Delta t_2 = t_0'$ (HOM)$-t_1'$ (LP01). The chromatic dispersion difference between the LP01 mode and the HOM is then given by Equation (3):

$$\Delta CD = (\Delta t' - \Delta t) / [(\lambda_2 - \lambda_1) \cdot l] \quad (3)$$

where l is length of the fiber 10 on test.

Figure 5C:
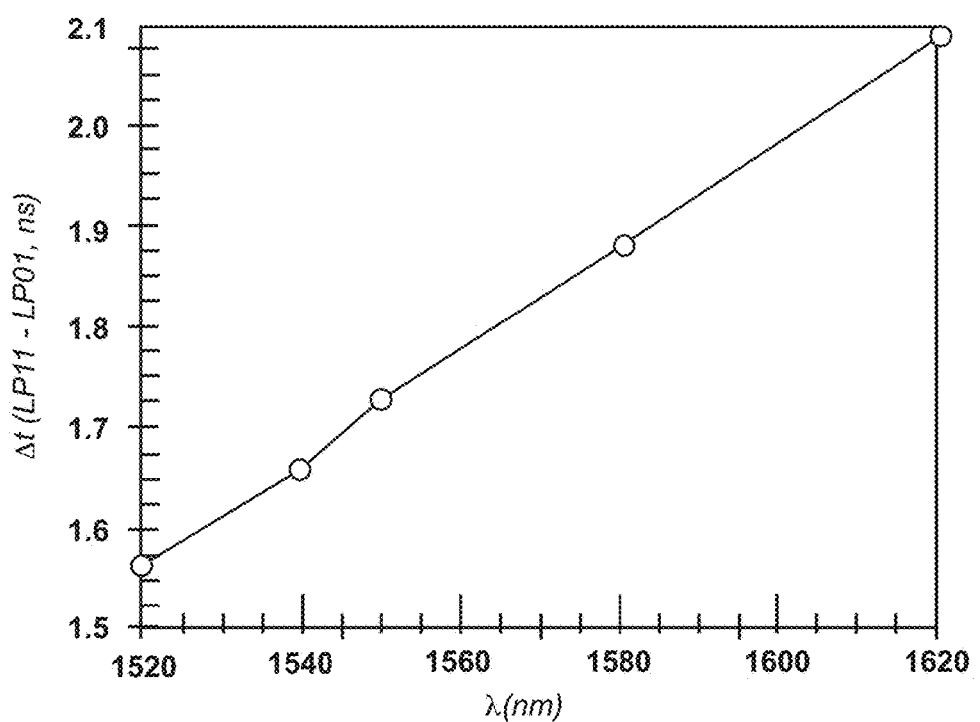
FIG. 5C is a plot of differential mode delay and chromatic dispersion results for an FMF tested with a differential mode delay measurement system according to an additional embodiment.

As shown in FIG. 5C, DMD between the LP01 and LP11 modes at different wavelengths were measured on an FMF using the prior-described methodology. Using Equation (3), the tested FMF (l=5431 m) has a $\Delta CD$ of 0.97 (ps/nm*km) in the measured wavelength range between the first higher order mode LP11 and the fundamental mode LP0. In effect, $\Delta CD$ is the slope of the line plotted in FIG. 5C.

Advantageously, the DMD measurement systems according to the foregoing (e.g., systems 50a, 50b and 50c) can be used to test MMFs and FMFs at multiple wavelengths during a single evaluation sequence without any equipment adjustments. DMD measurements systems 50a, 50b and 50c also provide improved bandwidth and time delay measurement accuracy and reliability compared to conventional DMD measurement systems that rely on a "one shot" pulse laser operating at one wavelength to generate a single time delay data set. Accuracy is improved because time delay evaluations are effected over much shorter pulse widths and better time resolutions than conventional DMD systems. Further, data reliability is improved because systems such as 50a, 50b and 50c generate a large time delay data set via the use of a pulse train signal 8 with repeating pulses at a given wavelength. The time delay data can be collected over a period of time and averaged to develop an average, calculated bandwidth value for the MMF or FMF on test. Still further, the DMD measurement systems such as 50a, 50b and 50c can facilitate the verification and refinement of peak bandwidth evaluations for a given MMF or FMF. Peak bandwidth values can be estimated based on testing at one particular initial wavelength. The results can then be verified and validated by subsequent testing with system 50a, 50b or 50c at the calculated peak bandwidth.

It will be apparent to those skilled in the art that various modifications and variations can be made without departing from the spirit or scope of the claims.

What is claimed is:

1. A differential mode delay measurement system for an optical fiber, comprising:
    an optical test fiber with a plurality of modes;
    a tunable laser that provides a plurality of continuous light wave signals to a modulator at wavelengths from about 600 nm to 1700 nm at a linewidth of 0.2 nm or less; and
    a pulse generator that provides an electrical pulse train signal to the modulator and a triggering signal to a receiver,
    wherein the modulator is configured to generate an intensity-modulated optical test signal through the optical fiber based at least in part on the received light wave and pulse train signals, and
    the receiver is configured to receive the test signal transmitted through the fiber and evaluate the test signal based at least in part on the triggering signal to determine differential mode delay information associated with the optical fiber at a plurality of wavelengths, and wherein the receiver is configured to receive the test signal transmitted through the fiber and evaluate the test signal based at least in part on the triggering signal to:

(a) determine differential mode delay information associated with the optical fiber at a plurality of wavelengths;

(b) calculate a peak bandwidth of the optical fiber based at least in part on the differential mode delay information associated with the optical fiber at the plurality of wavelengths; and (c) validate the peak bandwidth wavelength of the optical fiber by determining differential mode delay information associated with the optical fiber at the peak bandwidth wavelength.

2. The system according to claim 1, further comprising: a clock that provides a clock signal to the pulse generator, wherein the triggering signal is based at least in part on the received clock signal.

3. The system according to claim 1, further comprising: a single mode launch fiber coupled to the modulator and a fiber translation stage, wherein the stage is configured to transmit the intensity-modulated optical test signal through a plurality of radial locations of the test fiber via the single mode launch fiber.

4. The system according to claim 1, wherein the light source is a tunable laser that provides a plurality of continuous light wave signals at wavelengths in a subrange within the range of about 600 nm to 1700 nm corresponding to a mode of the optical test fiber.

5. The system according to claim 1, wherein the pulse generator is a pattern generator.

6. The system according to claim 1, wherein the receiver is a sampling scope configured to receive the test signal transmitted through the fiber and evaluate the test signal based at least in part on the triggering signal and a plurality of pulse train windows within the test signal.

7. A differential mode delay measurement system for an optical fiber, comprising:

an optical test fiber with a plurality of modes;

a single mode tunable laser that transmits a plurality of continuous light wave signals to a modulator unit at wavelengths in a subrange within the range of about 600 to 1700 nm; and a pulse generator that provides an electrical pulse train signal with a full width at half maximum of about or less than 200 picoseconds to the modulator unit and a triggering signal to a receiver, wherein the modulator is configured to generate an intensity-modulated optical test signal through the multimode fiber based at least in part on the received light wave and pulse train signals, and the receiver is configured to receive the test signal transmitted through the fiber and evaluate the test signal based at least in part on the triggering signal to determine differential mode delay information associated with the optical fiber at a plurality of wavelengths, and wherein the receiver is configured to receive the test signal transmitted through the fiber and evaluate the test signal based at least in part on the triggering signal to:

(a) determine differential mode delay information associated with the optical fiber at a plurality of wavelengths;

(b) calculate a peak bandwidth of the optical fiber based at least in part on the differential mode delay information associated with the optical fiber at the plurality of wavelengths; and (c) validate the peak bandwidth wavelength of the optical fiber by determining differential mode delay information associated with the optical fiber at the peak bandwidth wavelength.

8. The system according to claim 7, further comprising: a clock that provides a clock signal to the pulse generator, wherein the triggering signal is based at least in part on the received clock signal.

9. The system according to claim 7, further comprising: a single mode launch fiber coupled to the modulator and a fiber translation stage, wherein the stage is configured to transmit the intensity-modulated optical test signal through a plurality of radial locations of the test fiber via the single mode launch fiber.

10. The system according to claim 7, wherein the tunable laser provides a plurality of continuous light wave signals at wavelengths in a subrange within the range of about 600 nm to 1700 nm corresponding to a mode of the optical test fiber.

11. The system according to claim 7, wherein the receiver is a sampling scope configured to receive the test signal transmitted through the fiber and evaluate the test signal based at least in part on the triggering signal and a plurality of pulse train windows within the test signal.

12. A method of measuring optical properties of an optical fiber with a plurality of modes, comprising the steps:

directing a single mode, continuous light wave signal at a linewidth of 0.2 nm or less to a modulator;

directing an electrical pulse train signal with a full width at half maximum of about or less than 200 picoseconds to the modulator;

directing a triggering signal to a receiver based at least in part on the electrical pulse train signal;

generating an intensity-modulated optical test signal based at least in part on the light wave and pulse train signals;

transmitting the intensity-modulated optical test signal through an optical test fiber;

receiving the intensity-modulated optical test signal transmitted through the optical fiber;

evaluating the received test signal based at least in part on the triggering signal; and determining differential mode delay information associated with the optical fiber at a plurality of wavelengths based at least in part on the evaluating step;

calculating a peak bandwidth of the optical fiber based at least in part on the differential mode delay information associated with the optical fiber at the plurality of wavelengths, and validating the peak bandwidth wavelength of the optical fiber by conducting the determining step again to obtain differential mode delay information associated with the optical fiber at the peak bandwidth wavelength, wherein the step for directing a continuous light wave signal to a modulator includes directing a plurality of continuous light wave signals to the modulator, and further wherein each signal is set at a different wavelength.

13. The method of claim 12, wherein the transmitting step includes transmitting the intensity-modulated optical test signal through a plurality of radial locations of the fiber via a single mode launch fiber, and further wherein the determining step includes determining differential mode delay information associated with the radial locations of the optical fiber.

14. The method of claim 13, further comprising the step:
    calculating a centroid of the differential mode delay information associated with the radial locations of the optical fiber.

15. The method of claim 12, wherein the transmitting step includes transmitting intensity-modulated optical test signals through the optical fiber, and further wherein the receiving step includes averaging the intensity-modulated optical test signals transmitted through the optical fiber.

16. The method of claim 12, further comprising the step:
    determining modal delays between a plurality of the modes associated with the optical fiber.

17. The method of claim 12, further comprising the step:
    measuring chromatic dispersion information associated with the optical fiber.

18. The system of claim 1, wherein the tunable laser provides a plurality of continuous light wave signals to a modulator at wavelengths from about 600 nm to 1700 nm at a linewidth of 0.1 nm or less.

19. The method of claim 1, wherein the tunable laser provides a plurality of continuous light wave signals to a modulator at wavelengths from about 600 nm to 1700 nm at a linewidth of 0.05 nm or less.

* * * * *

UNITED STATES PATENT AND TRADEMARK OFFICE
CERTIFICATE OF CORRECTION

PATENT NO. : 10,260,990 B2  
APPLICATION NO. : 14/251869  
DATED : April 16, 2019  
INVENTOR(S) : Xin Chen et al.

Page 1 of 1

It is certified that error appears in the above-identified patent and that said Letters Patent is hereby corrected as shown below:

In the Claims

In Column 12, Line 47, Claim 12, after "signal;" delete "and".
In Column 12, Line 54, Claim 12, delete "wavelengths," and insert -- wavelengths; --, therefor.

Signed and Sealed this  
Twenty-ninth Day of October, 2019

Andrei Iancu  
*Director of the United States Patent and Trademark Office*